BULLDOZER ASSEMBLY WITH LOCKING PIN AND METHOD

BACKGROUND OF THE INVENTION

A conventional bulldozer assembly normally comprises a C-frame having a blade pivotally connected forwardly thereon. Such connection may comprise a single ball and socket connection disposed intermediate the ends of the blade to permit tilting, angling and tipping of the blade relative to the frame. The bulldozer assembly may further comprise a pair of laterally spaced push arms having their forward ends pivotally connected to the blade and the rearward ends adjustably mounted on the frame to be selectively reciprocated manually and adjusted to various positions to effect angling of the blade. A common problem arising with such a bulldozer assembly is one of preventing tipping of the blade relative to the frame when manual adjustment of the push arms is made to change the angle of the blade.

SUMMARY OF THIS INVENTION

The present invention is directed to overcoming one or more of the problems as set forth above.

According to the present invention, means are provided for assuring that a bulldozer blade will not tip forwardly or backwardly upon selective angling thereof. The bulldozer assembly of this invention comprises a normally horizontally disposed frame having the normally vertically disposed blade disposed forwardly thereof. A ball and socket connection universally connects the blade to the frame and a pair of laterally spaced push arms have forward ends thereof pivotally connected to the blade.

Rearward ends of the push arms are adjustably mounted on the frame to selectively angle the blade relative to the frame. Prior to such angling, a pin means is removably mounted in the ball and socket connection to prevent tipping of the blade relative to the frame. Such pin means preferably comprises a vertically disposed cotter pin disposed in aligned apertures formed in a bracket and ball of the ball and socket connection.

BRIEF DESCRIPTION OF THE DRAWINGS

Other objects of this invention will become apparent from the following description and accompanying drawings wherein:

FIG. 1 is a top plan view of a bulldozer assembly mounted on the forward end of a tractor;

FIG. 2 is an enlarged top plan view, particularly illustrating a ball and socket connection for universally connecting a blade to a C-frame of the bulldozer assembly; and FIG. 3 is a sectional view through the ball and socket connection, taken in the direction of arrows III—III in FIG. 2.

DETAILED DESCRIPTION

FIG. 1 illustrates a bulldozer assembly 10 mounted on the forward end of a track-type tractor 11. The bulldozer assembly comprises a normally horizontally disposed C-frame 12 having rearward ends thereof universally mounted on opposite sides of the tractor by ball and socket connections 13 and 14 in a conventional manner. A pair of laterally spaced double-acting hydraulic lift cylinders 15 and 16 are pivotally interconnected between the frame and the tractor to selectively raise or lower the bulldozer assembly relative to ground level.

A pair of laterally spaced push arms 17 and 18 each has its rearward end universally connected to frame 12 by a ball and socket connection 19. Each connection comprises a ball 20 secured to frame 12 by a bracket 21 and disposed in a mating socket defined on a respective push arm. It should be noted that three longitudinally spaced brackets are attached on the frame in longitudinally spaced relationship to provide selective adjustment of each push arm thereon for purposes hereinafter explained.

The forward end of each push arm is universally connected to a blade 22 of the bulldozer assembly by a ball and socket connection (not shown). A pair of brace means 23 and 24 are pivotally interconnected between the blade and push arms 17 and 18, respectively. The normally vertically disposed blade is adapted to be tilted by at least one of the brace means which may constitute a double-acting hydraulic tilt cylinder or a manually adjustable brace of conventional design. The blade is universally connected to frame 12 directly by a ball and socket connection 25 to normally permit tilting, angling and/or tipping of the blade relative to the frame.

As shown in FIGS. 2 and 3, connection 25 comprises a bracket, including a block 26 secured behind and intermediate the ends of the blade and a removable cap 27. The block and cap define a spherical socket 28 which receives a like-shaped spherical ball 29 therein. The ball is secured to a shank 30 which extends rearwardly through frame 12 and has a nut 31 threadably mounted thereon. It should be noted that clearances are provided between the frame and the nut and the frame and ball 29 to permit shank 30 to reciprocate slightly relative to the frame.

A problem encountered with the selective angling of blade 22 relative to frame 12 is one of preventing tipping of the blade upon selective adjustment of push arms 17 and 18 to dispose the blade at its angled position 22', for example. Such adjustment, of course, is effected by releasing connections 19 for each push arm and by reconnecting the rearward end of push arm 17 to the rearwardmost bracket 21 and by reconnecting the rearward end of push arm 18 to the forwardmost bracket on that respective side of the frame.

Such problem is overcome by initially inserting a pin means, such as a cotter pin 32, through aperture 33, formed centrally through ball 29. Thus, installation of pin 32 in place prior to angling adjustment of the blade to its 22' position in FIG. 1 will prevent the blade from tipping forwardly or rearwardly during such adjustment. It should be noted that transversely disposed apertures or slots 34 and 35 are formed in block 26 and cap 27, on either side of ball 29, to facilitate insertion of pin 32 through aperture 33, i.e., to compensate for any possible misalignment between ball 29 and block 26-cap 27 supporting structure for the ball. Upon completion of such adjustment, the pin may be stored in an elongated aperture 36 formed in block 26.

The embodiments of the invention in which an exclusive property or privilege is claimed are defined as follows:

1. In a bulldozer assembly of the type comprising a normally horizontally disposed frame, a normally vertically disposed blade positioned forwardly of said frame, a ball and socket connection universally connecting said blade to said frame and a pair of laterally spaced push

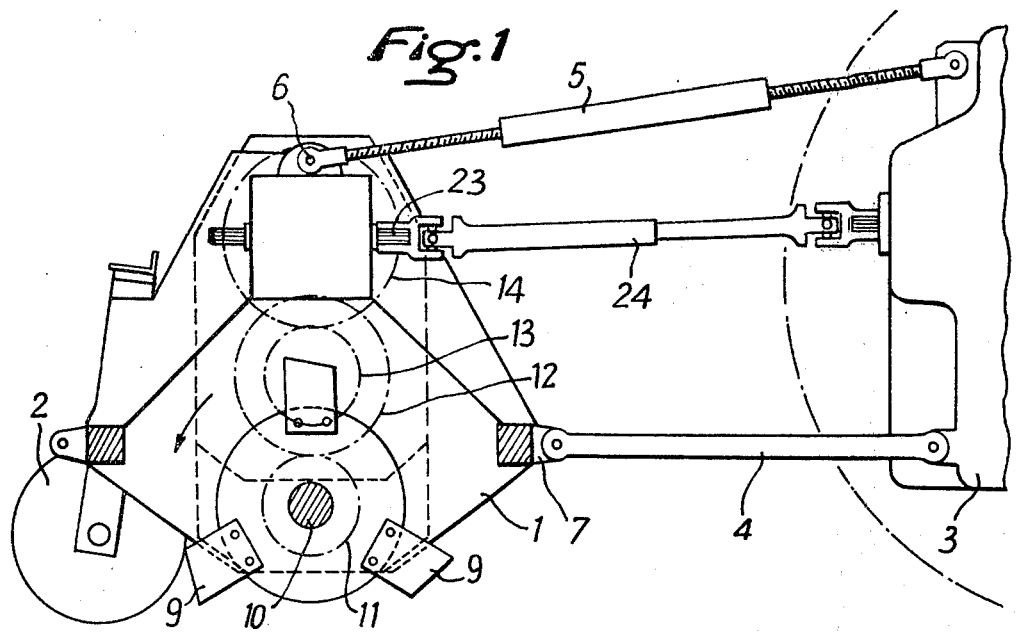
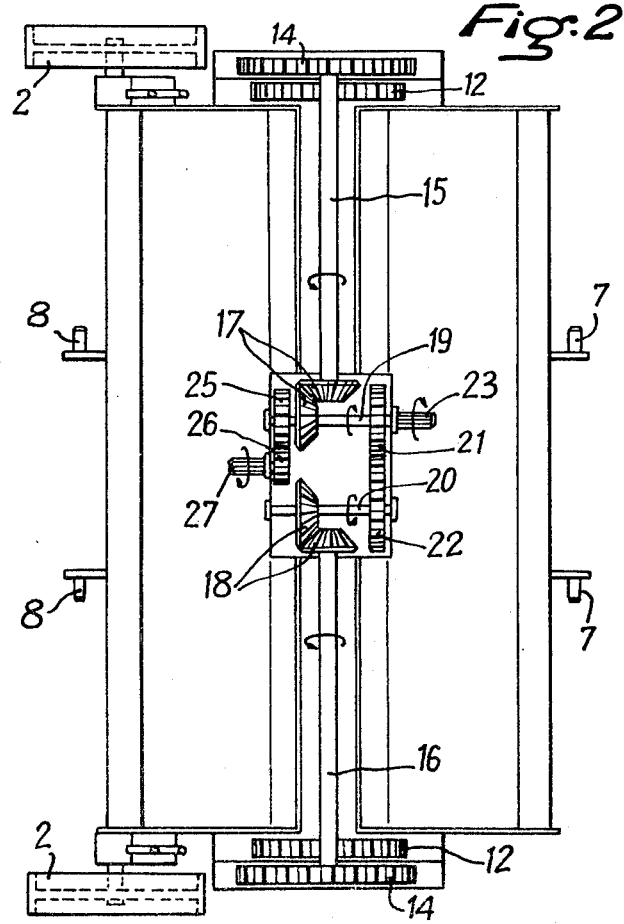
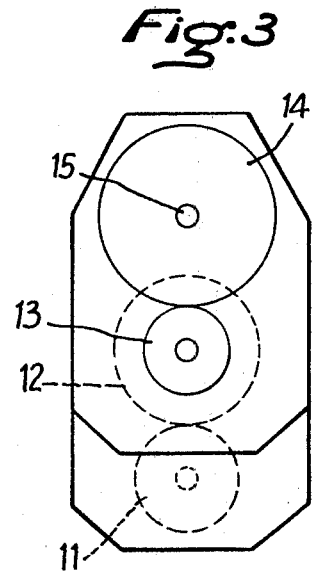

MANURE CRUSHING AND EARTH MIXING ROTARY MACHINE

BACKGROUND OF THE INVENTION

1. Field of the Invention

The present invention relates in general to farming machines intended for preparing the soil and has specific reference to a rotary machine of this type which is capable of crushing manure and mixing or harrowing the soil preliminary to seeding operations.

2. Description of the Prior Art

Rotary machines for preparing the stubble having hitherto been designed according to the current harrow practice. These rotary machine are operated as a rule at rotational velocities of the order of 250 r.p.m. and therefore the mulch, grass and residual hay on the soil surface are simply mixed with the earth without being crushed, so that their decay takes a relatively long time.

SUMMARY OF THE INVENTION

This invention is especially directed to a rotary machine capable of crushing both green manure and stubble during a first phase and to subsequently mix up the crushed manure with the earth, so that the ensuing decay takes place much more rapidly before the seeding operation.

To perform these different operations, the machine should have two speed ranges, i.e. a first or low range of the order of 250 r.p.m. for mixing the soil and a second or high range of the order of 1,000 r.p.m. for crushing the green manure and stubble; besides, the machine should be capable of revolving in either direction, namely in the direction of travel of the machine for mixing the soil and in the opposite direction for the preliminary crushing of manure.

To meet these requirements, the machine according to the present invention comprises two opposite hitching systems designed the one for the harrowing function and the other for crushing the manure, each hitching system being associated with a separate power input member for rotatably driving the tool carrier shaft. Therefore, the machine comprises two opposite hitching systems and two power inputs also opposed to each other, whereby the desired opposite directions of rotation can be obtained while keeping the same rotation direction of the tool-carrier in relation to the machine frame, in one or the other circumstance of utilisation. This arrangement is advantageous in that it allows to use, as well for the mixing work as for the crushing work, the same cutting edge of the tools.

As to the different velocities of rotation, they are obtained by simply interchanging two pinions of two lateral gear trains for transmitting the torque from the power or driving shaft to the tool carrier shaft.

BRIEF DESCRIPTION OF THE DRAWING

FIG. 1 is a vertical longitudinal section showing a preferred embodiment of the machine according to this invention hitched to the rear of a towing tractor;

FIG. 2 is a fragmentary plan view from above showing more particularly the mechanism for transmitting the torque to the tool carrier shaft, and FIG. 3 is a diagrammatic, simplified view of one of the lateral gear trains, as seen from the outside.

DESCRIPTION OF THE PREFERRED EMBODIMENT

The manure-crushing and earth-mixing rotary machine according to this invention comprises a main frame 1 and a pair of lateral carrier wheels 2; this machine is adapted to be hitched to a tractor 3 by means of a conventional three-point attachment comprising a pair of lower side rods 4 and a single upper central rod 5 connected to the top bearing pin 6 of the machine. The lower rods 4 are adapted to be pivotally connected to either of two pairs of hitching pins 7, 8 fixedly carried by the machine: one pair of pins 7 is disposed on one side of the machine, the other pair of pins 8 being disposed on the opposite side, as clearly shown in FIG. 2.

The crushing and mixing tools or blades 9 are carried by a carrier assembly having a transverse shaft 10 provided at its ends with side pinions 11 meshing with driving pinions, as will be explained presently.

In the assembly illustrated in the drawing the lower rods 4 are connected to hitching pins 7 and the driving pinions meshing with pinions 11 consist of toothed wheels 12 rigid with adjacent pinion 13 meshing in turn with toothed power wheels 14 keyed or otherwise fastened to transmission half-shafts 15, 16 operatively connected through bevel gears 17, 18 to longitudinal stub shafts 19, 20 rotating in opposite directions and at the same speed, these stud shafts 19, 20 being interconnected by meshing pinions 21, 22 respectively. The stub shaft 19 comprises at its end nearest to the pair of hitching pins 7 a splined or like power input portion 23 adapted to be drivingly coupled to the power take-off of the tractor through a cardan drive shaft 24 for crushing the mulch, stubble or green grass, by rotatably driving the tool carrier at high speed in a direction opposite to the direction of travel of the tractor. At its opposite end, the stub shaft 19 is operatively connected via a train of reversing gears 25, 26 to another longitudinal stub shaft 27 constituting the power input member for the mixing operation during which the tool carrier is rotated in the direction of travel of the tractor and at a lower rotational velocity.

The mode of operation of this machine will be clearly apparent from the above description to those skilled in the art; however, it will be explained more in detail hereinafter, with reference firstly to the transmission path providing the fast rotation of the tool carrier shaft 10 when the hitching is through pins 7, as shown in the drawing. The arrows of FIGS. 1 and 2 show merely the shafts rotating constantly in the same direction with respect to the frame of the machine (though changing this direction of rotation with respect to its direction of travel). The cardan drive shaft 24 drives the stub shaft 19 through the power input portion 23 thereof, and this shaft 19 drives in turn the half-shaft 15 through bevel gears 17 and half-shaft 16 through pinions 21 and 22, shaft 20 and bevel gears 18. The half-shafts 15, 16 rigid with the driving toothed wheels 14 are in constant meshing engagement with pinions 13, thus driving the latter as well as the toothed wheels 12 rigid therewith and meshing in turn with the wheels 11 of the tool carrier shaft 10, whereby this shaft 10 will rotate at a higher speed (overdrive) with the transmission ratio provided by gears 14, 13, 12 and 11, and in a direction opposite to the direction of travel of the machine for performing the mulch and stubble crushing operation.

To perform the subsequent soil mixing operation, the machine is hitched to the tractor through the other pack of pins 8 and the drive is provided through the opposite power input 27. The torque is thus transmitted via pinions 26, 25 to stub shaft 19 which, in relation to the frame 1, will still rotate in the direction of the arrow, as shown, but this time in the direction of travel of the tractor pulling the machine from the opposite side. To obtain a lower speed, it is only necessary to interchange the toothed wheels 14 and 13; in other words, the half-shafts 15 and 16 are rigid with pinions 13 and drive the wheels 14 rigid with pinions (not shown) meshing with gear wheels 11. Thus, assuming for instance that the diameter of wheels 14 is twice that of pinions 13, it is clear that the meshing between 14 and 13 will step up the angular velocity in the ratio of 2:1 for the crushing operation and step down this velocity in the same ratio for the mixing operation which will therefore take place at a velocity four times lower than the preceding angular velocity.

It will be readily understood that the above-described form of embodiment illustrated in the accompanying drawing should not be construed as limiting the scope of the invention, since many modifications and changes may be brought thereto without departing from the basic principles of the invention as set forth in the appended claims.

What I claim is:

1. A combine manure-crushing and soil-mixing rotary machine adapted to be hitched to a tractor having a power take-off, which comprises a main frame having front and rear portions, a transverse shaft rotatably mounted in said frame and tool means mounted on said transverse shaft, gear means on said main frame for rotating said transverse shaft in opposite directions, said gear means comprising first means for receiving power from the power take-off of a tractor for rotating said transverse shaft in one direction and second means for alternately receiving power from the power take-off of a tractor for rotating said transverse shaft in the other direction, said first means extending toward the front of said main frame and said second means extending toward the rear of said main frame, a first set of hitching means disposed at the front of the main frame for coupling the machine to a tractor and a second set of hitching means disposed on the rear of the main frame for coupling the machine to a tractor, with said main frame reversed.

2. A combine manure-crushing and soil-mixing rotary machine as set forth in claim 1 wherein said gear means further comprises a cardan drive adapted to be coupled at one end to said power take-off and coupled at the other end to one of said first and second means, said first and second means comprising a pair of longitudinal central stub shafts, gear means interconnecting said stub shafts for causing said stub shafts to rotate in opposite directions when driven; a pair of lateral half-shafts extending laterally from, and operatively connected through bevel gears to, one of said pair of central stub shafts, for rotating said half-shafts; a train of spur gears at the outer end of each half-shaft, and drivingly connecting each half-shaft to one opposite end of said transverse shaft, and interchangeable toothed wheels having different diameters in each one of said gear trains for obtaining different velocities of rotation of said tool carrier shaft.

* * * * *